US009135928B2

(12) United States Patent
Dellisanti et al.

(10) Patent No.: US 9,135,928 B2
(45) Date of Patent: Sep. 15, 2015

(54) AUDIO TRANSMISSION CHANNEL QUALITY ASSESSMENT

(71) Applicant: Bose Corporation, Framingham, MA (US)

(72) Inventors: Michael James Dellisanti, Seattle, WA (US); Lee Zamir, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 185 days.

(21) Appl. No.: 13/827,614

(22) Filed: Mar. 14, 2013

(65) Prior Publication Data

US 2014/0278423 A1    Sep. 18, 2014

(51) Int. Cl.
| | |
|---|---|
| *G10L 25/60* | (2013.01) |
| *H04M 3/22* | (2006.01) |
| *G10L 25/69* | (2013.01) |
| G10L 15/26 | (2006.01) |
| H04M 3/56 | (2006.01) |
| H04N 7/14 | (2006.01) |

(52) U.S. Cl.
CPC ............. *G10L 25/60* (2013.01); *G10L 25/69* (2013.01); *H04M 3/2236* (2013.01); *G10L 15/26* (2013.01); *H04M 3/56* (2013.01); *H04N 7/147* (2013.01)

(58) Field of Classification Search
CPC ....... G10L 19/005; G10L 25/78; G10L 15/20; G10L 21/02; G10L 21/0208; G10L 21/0216
USPC .................................................. 704/226–228
See application file for complete search history.

(56) References Cited

U.S. PATENT DOCUMENTS

| | | | | |
|---|---|---|---|---|
| 5,848,384 A * | 12/1998 | Hollier et al. | ................. | 704/231 |
| 6,700,953 B1 | 3/2004 | Maurer | | |
| 7,092,880 B2 * | 8/2006 | Ivanic et al. | .................. | 704/231 |
| 8,599,704 B2 * | 12/2013 | Wang et al. | .................... | 370/251 |
| 8,837,298 B2 * | 9/2014 | Putnam et al. | ................ | 370/241 |
| 2003/0189603 A1 * | 10/2003 | Goyal et al. | ................. | 345/863 |
| 2004/0162722 A1 * | 8/2004 | Rex et al. | ....................... | 704/211 |
| 2006/0031469 A1 * | 2/2006 | Clarke et al. | .................. | 709/224 |
| 2007/0143103 A1 * | 6/2007 | Asthana et al. | ............... | 704/200 |
| 2007/0239429 A1 * | 10/2007 | Johnson et al. | ................... | 704/8 |
| 2008/0177534 A1 * | 7/2008 | Wang et al. | .................... | 704/211 |

(Continued)

OTHER PUBLICATIONS

International Search Report issued on Jul. 7, 2014 for corresponding PCT Application No. PCT/US2014/027148.

(Continued)

*Primary Examiner* — Douglas Godbold
(74) *Attorney, Agent, or Firm* — Brian M. Dingman; Dingman, McInnes & McLane, LLP

(57) ABSTRACT

A device, system and method for audio transmission quality assessment that occurs during the transmission. A transmission channel such as the internet is used to transmit speech that is spoken by a human speaker, captured at a first end, and transmitted over the transmission channel for reproduction at a second end. The processors at each end of the transmission channel are configured to determine one or more characteristics of the speech such as phonemes. The phonemes are transmitted over a backchannel of the transmission channel to a processor that compares the speech characteristics that were determined at both ends of the call. The participants are notified of a transmission problem that has had an effect on the intelligibility of the speech that was reproduced at the far end if the comparison does not meet a predetermined quality metric.

20 Claims, 4 Drawing Sheets

(56) References Cited

U.S. PATENT DOCUMENTS

2009/0319268 A1* 12/2009 Aumont et al. ............ 704/236
2013/0041669 A1* 2/2013 Ben-David et al. ......... 704/260
2013/0144619 A1* 6/2013 Lord et al. ................. 704/235

OTHER PUBLICATIONS

Written Opinion of the International Searching Authority issued on Jul. 7, 2014 for corresponding PCT Application No. PCT/US2014/027148.

Chernick, C.M., et al: "Testing the ability of speech recognizers to measure the effectiveness of encoding algorithms for digital speech transmission", MILCOM 1999. IEEE Military Communications. Conference Proceedings (CAT. No. 99CH36341) IEEE Piscataway, NJ, USA, IEEE, vol. 2, Oct. 31, 1999, pp. 1468-1472, XP010369689, DOI: 10.1109/MILCOM.1999.821447 ISBN: 978-0-7803-5538-5 Subsection entitled "Automated Scoring Using a Speech Recognizer".

Wenyu Jiang, et al: Speech recognition performance as an effective perceived quality predictor, IEEE 2002 Tenth IEEE International Workshop on Quality of Service (CAT. No. 02EX564) IEEE Piscataway, NJ, USA, IEEE, No. 10th, Jan. 1, 2002, pp. 269-275, XP002594253, ISBN: 978-0-7803-7426-3.

* cited by examiner

AUDIO TRANSMISSION CHANNEL QUALITY ASSESSMENT

FIELD

This disclosure relates to notifying the sender when the quality of audio transmissions is poor.

BACKGROUND

Audio communications over transmission channels, particularly wireless communications and communications over the internet or other networks with variable signal paths, typically occur without direct feedback to the speaker and the recipient of the quality of the audio that is delivered to the recipient. Complex, expensive transmission channel test systems can be used by highly-skilled engineers to evaluate a specific communications channel at a specific point in time as a means to establish high-quality audio communications over a fixed path. However, computer network and wireless-based communications transmission channels are usually dynamic over the course of the telephone call or multi-media session. Testing of the transmission channel thus is not effective to ensure high quality audio transmission throughout the call.

SUMMARY

Identification of problems associated with the transmission of audio signals over telecommunication channels, and subsequent notification to the people on the call, can help with the overall quality of the telephone call or multi-media session. By comparing the speech, or characteristics of the speech, at the near end of a transmission channel where the speaker is located to the same speech or speech characteristics after the speech has been received at the receiving or far end of the transmission channel, problems associated with the transmission channel can be identified. If the problems affect the speech to an extent that its intelligibility is unacceptably degraded, notifying the participants of the problem while the call is ongoing can allow the speaker to make adjustments directed towards resolving the problem; the adjustments can, for example, include speaking more slowly or hanging up and reconnecting. Interrogation of the quality of the speech can be based on the speech itself, or on characteristics of the speech such as speech phonemes. By detecting characteristics of speech at both ends of the telecommunications channel, and comparing such characteristics while the speech transmission is in process, the quality of the transmission channel can be evaluated even should the communication path vary over the course of the call.

In one aspect, a method and device is used to evaluate the quality of a transmission channel as the transmission channel is being used to transmit speech. The user's speech is captured at what is termed a first or near end. The speech is transmitted over the transmission channel and reproduced to a listener at what is termed a second or far end. During the course of a conversation, then, the location of the near and far end switches depending on which person is speaking. One or more characteristics of the speech are determined at both the near end and the far end. These speech characteristics are then compared. The comparison can take place at the near end, at the far end, or at another location. The results of the comparison are then fed back to the near end user (i.e., the person speaking) during the conversation. The results can also be fed back to the far end user. If the comparison indicates that the audio reception is poor, the user can take action meant to increase intelligibility. In one non-limiting example, the characteristics of the speech that are determined and compared are the phonemes of the speech, and an audio transmission problem may be indicated to the user if a threshold number of errors are detected in the comparison of the phonemes.

Embodiments may include one of the following features, or any combination thereof. The characteristics of the speech may comprise speech phonemes. The predetermined quality metric may comprise a threshold number of errors in a comparison of the speech phonemes. The comparison can be made at the near end, the far end or another location that is accessible to both the near end and the far end. There may be a telepresence network appliance at each of the near end and the far end, each such network appliance comprising a video display and an audio output device, each such network appliance configured to send and receive voice and video over the transmission channel, and wherein the notification of the speaker comprises at least one of a video notification and an audio notification conveyed via the near end network appliance. The notification may comprise a warning message superimposed on the video display of the near end network appliance. The method may further include causing notification of the recipient at the far end if the comparison does not meet a predetermined quality metric. The method may further include performing speech recognition of the speech at both the near end and the far end and displaying the recognized speech, and wherein the notification comprises highlighting displayed words that were not received properly at the far end.

In another aspect, a device configured for evaluation of the quality of a transmission channel while the transmission channel is being used to transmit speech that was spoken by a human speaker, captured at a near end, and transmitted over the transmission channel for reproduction at a far end includes a processor at one end of the transmission channel and configured to determine one or more characteristics of the speech, receive over a backchannel of the transmission channel the same characteristics of the same speech that have been determined at the other end of the transmission channel, compare the determined speech characteristics and the received speech characteristics, and notify the speaker if the comparison does not meet a predetermined quality metric.

Embodiments may include one of the following features, or any combination thereof. The characteristics of the speech may comprise speech phonemes. The predetermined quality metric may comprise a threshold number of errors in a comparison of the speech phonemes. There may be a telepresence network appliance at each of the near end and the far end, each such network appliance comprising a processor, a video display and an audio output device, each such network appliance being configured to send and receive voice and video over the transmission channel, and wherein the notification of the speaker comprises at least one of a video notification and an audio notification conveyed via the near end network appliance. The notification may comprise a warning message superimposed on the video display of the near end network appliance.

In another aspect, a system for the real-time evaluation of the quality of a transmission channel, wherein the transmission channel is used to transmit speech that is spoken by a human speaker, captured at a near end, and transmitted over the transmission channel for reproduction at a far end, includes a first processor configured to determine one or more characteristics of the speech at the near end, and a second processor configured to determine the same characteristics of the same speech after it has been received at the far end. At least one of the first and second processors are further configured to cause communication of determined characteristics between the near end and the far end over a backchannel of the transmission channel. At least one of the first and second processors are still further configured to compare the speech characteristics determined by the first and second processors, and at least one of the first and second processors are still further configured to cause notification to the speaker if the comparison does not meet a predetermined quality metric.

Embodiments may include one of the following features, or any combination thereof. The characteristics of the speech may comprise speech phonemes. The predetermined quality metric may comprise a threshold number of errors in a comparison of the speech phonemes. The second processor may be configured to cause transmission to the near end of the phonemes it has determined. The system may further include a telepresence network appliance at each of the near end and the far end, each such network appliance comprising a processor, a video display, and an audio output device, and being configured to send and receive voice and video over the transmission channel, and wherein the notification to the speaker comprises at least one of a video notification and an audio notification conveyed via the near-end network appliance. The notification may comprise a warning message superimposed on the video display of the near-end network appliance. The second processor may be further configured to determine the same characteristics of the same speech after the speech has been received at the far end and then reproduced at the far end by a loudspeaker.

BRIEF DESCRIPTION OF THE DRAWINGS

The foregoing and other objects, features and advantages will be apparent from the following description of particular examples of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

During a two-party or multi-party telephone call or multi-media session, the audio portion of the communication can be facilitated if the parties are apprised of degradation in the quality of the audio transmission. This result can be achieved by determining characteristics of the speech at the near end where it is spoken, and determining the same characteristics of the same speech at the far end where it is delivered to the listener(s). A comparison of the speech characteristics that were determined at each end can then be made. If the comparison does not meet a predetermined quality metric (typically, a metric that has been determined to be indicative of unacceptably reduced intelligibility), all of the parties on the call can be notified. Alternatively, only the person speaking can be notified of a problem. This allows the speaker to take actions aimed at rectifying or compensating for the problem, for example by speaking more slowly or repeating the last uttered speech that the speaker was notified was unintelligible. It also ensures that the listeners are aware of the error state.

The comparison of the characteristics of the speech that are determined at both ends of the transmission can be made at either the near end or the far end, or even at a different location that is accessible to both the near end and the far end. The determined characteristics, or information representing the determined characteristics, will need to be transmitted from at least one end to the processor that accomplishes the comparison. This transmission desirably takes place over a backchannel of the transmission channel over which the audio transmission is made. In a two-ended telephone call or multi-media session, the comparison is preferably made by a processor of the telepresence network appliance that is used to capture and transmit the communication at the near end. Notification to the participants of a poor quality transmission is typically one or both of a visual and audio notification using the local telepresence network appliance.

Figure 1:
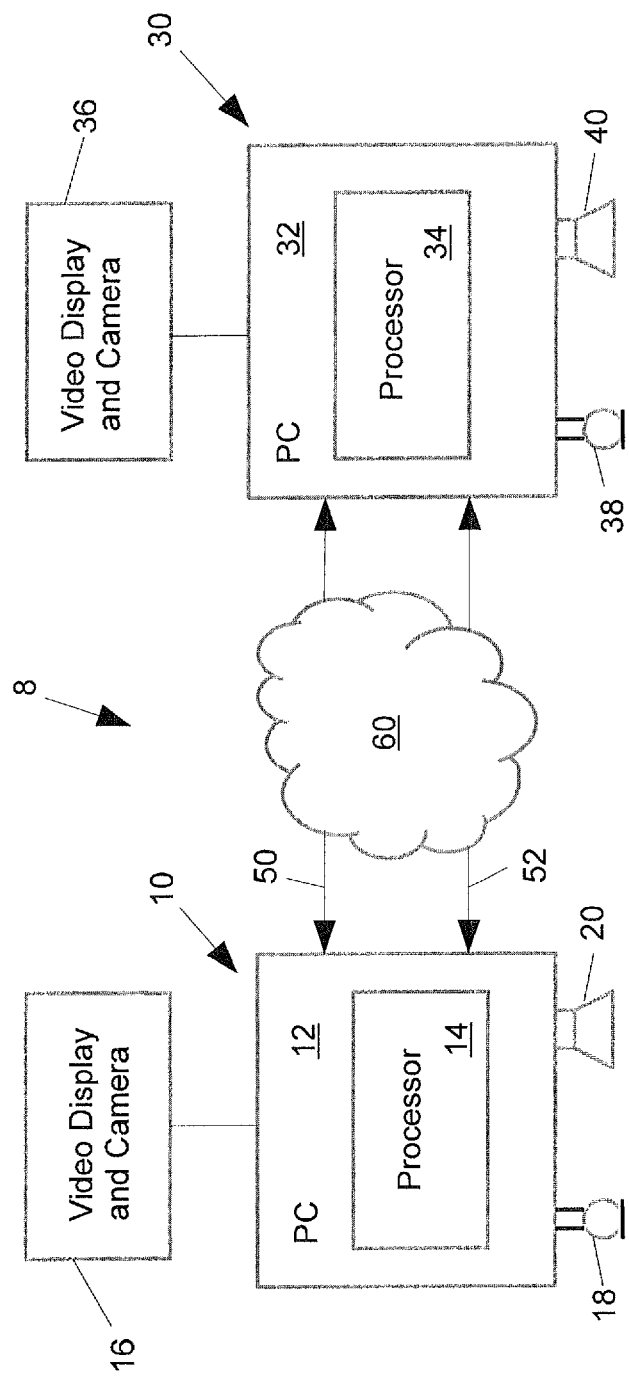
FIG. 1 is a schematic block diagram of a system that accomplishes quality assessment of an audio transmission.

FIG. 1 is a schematic representation of a system 8 for the real-time evaluation of a quality of a transmission channel. System 8 can also be used to accomplish the methods described herein. System 8 also comprises the devices described herein.

System 8 comprises near-end telepresence network appliance 10 which may be a personal computer 12 with a processor 14. The CPU of a computer may accomplish all of the necessary processing, or there could be a separate device such as a distributed file system processor or a micro-controller; the disclosure is not limited to any particular architecture. Far-end telepresence network appliance 30 may be a personal computer 32 with a processor 34. Each PC has a microphone 18 and 38, respectively, a loudspeaker to play voice (or an audio output for providing a signal to a set of headphones, where the headphones may also include a microphone which can be used in place of PC microphone 18) and other sounds 20 and 40, respectively, and a video display and associated video camera 16 and 36, respectively. Other hardware can be used to accomplish the audio connection and other aspects of the methods described herein. The telepresence network appliances communicate in a known fashion. In this non-limiting example, the communication is accomplished using internet or other network 60. The transmission channel is indicated at 50. Bi-directional backchannels of transmission channel 50 are indicated at 52.

In use, there would be a person at each end, typically sitting in front of a PC or laptop that has a video display, a video camera, an audio output and microphone. The disclosure also applies to telephone calls and other manners of accomplishing electronic audio communication, as further described below. The multi-media session conducted between the two users would take place over transmission channel 50. Both video and audio signals are sent and received by each network appliance at each end of channel 50. An example of a voice over internet protocol service that can manage such a multi-media session is Skype®, available from Microsoft Corporation.

One telepresence network appliance 10 or 30 is located at what is termed the "near-end," which is the end where the person who is currently speaking is found. The one or more remote telepresence network appliances such as appliance 30 that are receiving the communication are at what is termed herein the "far-end." As the speaker talks, the voice is picked up by microphone 18. Processor 14 is configured to send over transmission channel 50 a speech signal that represents the speech.

Processor 14 is also configured to determine one or more characteristics of the speech that was picked up by microphone 18. Characteristics are distinguishing features or qualities of the speech, in contrast to the speech per se. Each far-end telepresence network appliance also includes a processor (in this case, processor 34) that is configured to determine the same characteristics of the speech that were determined by the near-end processor, after the speech has been received at the far end. The determination of the speech characteristics at the far end can be done on the digitized speech signal. Or, the analog speech signal could be converted to digital and the characteristics could then be determined. Another alternative would be that the audio captured by the far end microphone could be input to the far end phoneme detector; this would provide a replica of the speech that was output by the far end rendering system into the acoustic environment at the far end.

An example of a characteristic of speech that can be determined by the near-end and far-end processors are the speech phonemes. Phonemes are the basic unit of a language's phonology, as is known in the field of linguistics. A phoneme can be described as the smallest segmental unit of sound employed to form meaningful contrasts between utterances. Human speech has a limited number of phonemes. Transmitted and reproduced speech cannot be understood by the user at the far end if the phonemes are not transmitted and reproduced correctly. Phonemes can be determined in any known fashion. In one non-limiting example the phonemes are determined by the front end of speech recognition software. As one non-limiting alternative to phoneme detection, the speech can be detected (e.g., using commercial speech detection software) and the detected words can be compared.

The speech is broken down into phonemes that represent the speech at both the near end where it is spoken and the far end after the speech has been transmitted. If the two sets of phonemes are identical, one would conclude that the speech was transmitted without degradation. If the phonemes detected at the far end differ from those detected at the near end, one would conclude that the speech was degraded by the transmission channel 50. By comparing the difference in detected phonemes the quality of the speech reproduced at the far end is inferred. When the difference in compared phonemes exceeds a predetermined threshold a notification can be sent to at least the speaker (the near-end user), and preferably to all participants, that the speech intelligibility at the far end has degraded sufficiently to make communication difficult.

The next step is a comparison of the speech characteristics determined at the near end to those determined at the far end (or far ends when there is more than one recipient of the call). This comparison can be accomplished by a processor of one or both of the computers or other telepresence network appliances involved in the call. In one example, the comparison is accomplished by near-end processor 14. Alternatively, the comparison can be made by far-end processor 34. Or, the comparison can be made at both ends, which could facilitate error notification to all participants on the call or multimedia session. Another alternative not depicted in FIG. 1 is that a separate processor that is in communication with the near end and far end processors could be used to conduct the comparison and cause notification to the call participants. In each case, one or both of the near end and far end processors can be configured to either send or receive over backchannel 52 of transmission channel 50 the characteristics of the speech that have been determined. The processor(s) conducting the comparison then has the characteristics from the near end and the far end (or far ends), and compares them. In the case of phonemes, there are a small number of phonemes per second in normal human speech. Thus, the backchannel data flow is fairly light. This data transmission can easily be conducted with full robust error checking since the data quantity is so low. Because the data rate of the characteristics is much lower than the data rate needed to transmit the speech itself, the characteristics can be reliably communicated over a poor quality transmission channel without error. This allows the system to provide a robust comparison of the characteristics, even when the transmission channel has degraded performance. Because of the significant difference in data rates, the speech will have degraded to the point where it was completely unintelligible long before the characteristic data could no longer be reliably transmitted.

Figure 2A:
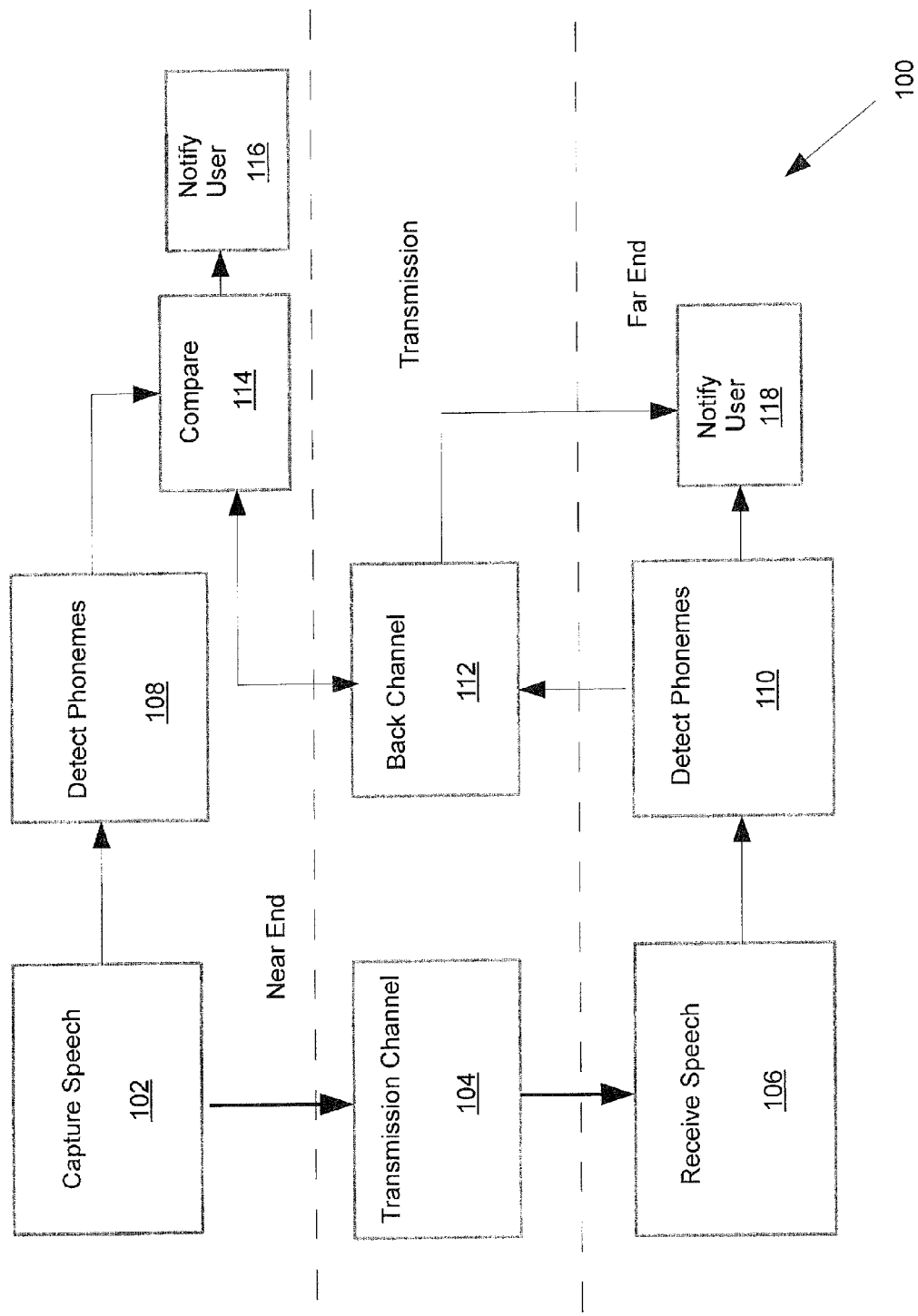
FIGS. 2A, 2B and 2C are block diagrams illustrating three schemes for determining phonemes of speech at both ends of an audio communication and notifying the participants of problems with intelligibility of the received audio.
Figure 2B:
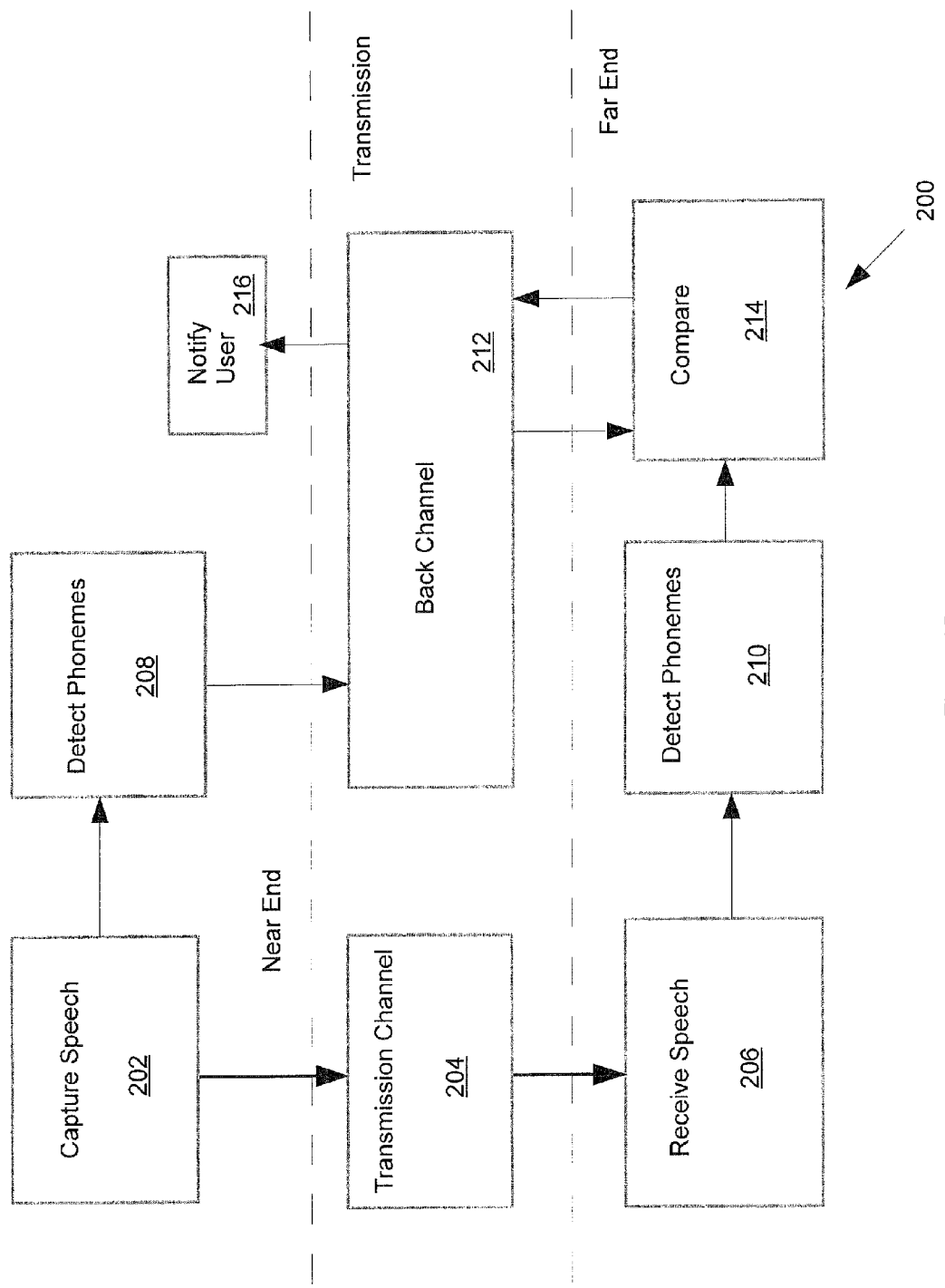
Figure 2C:
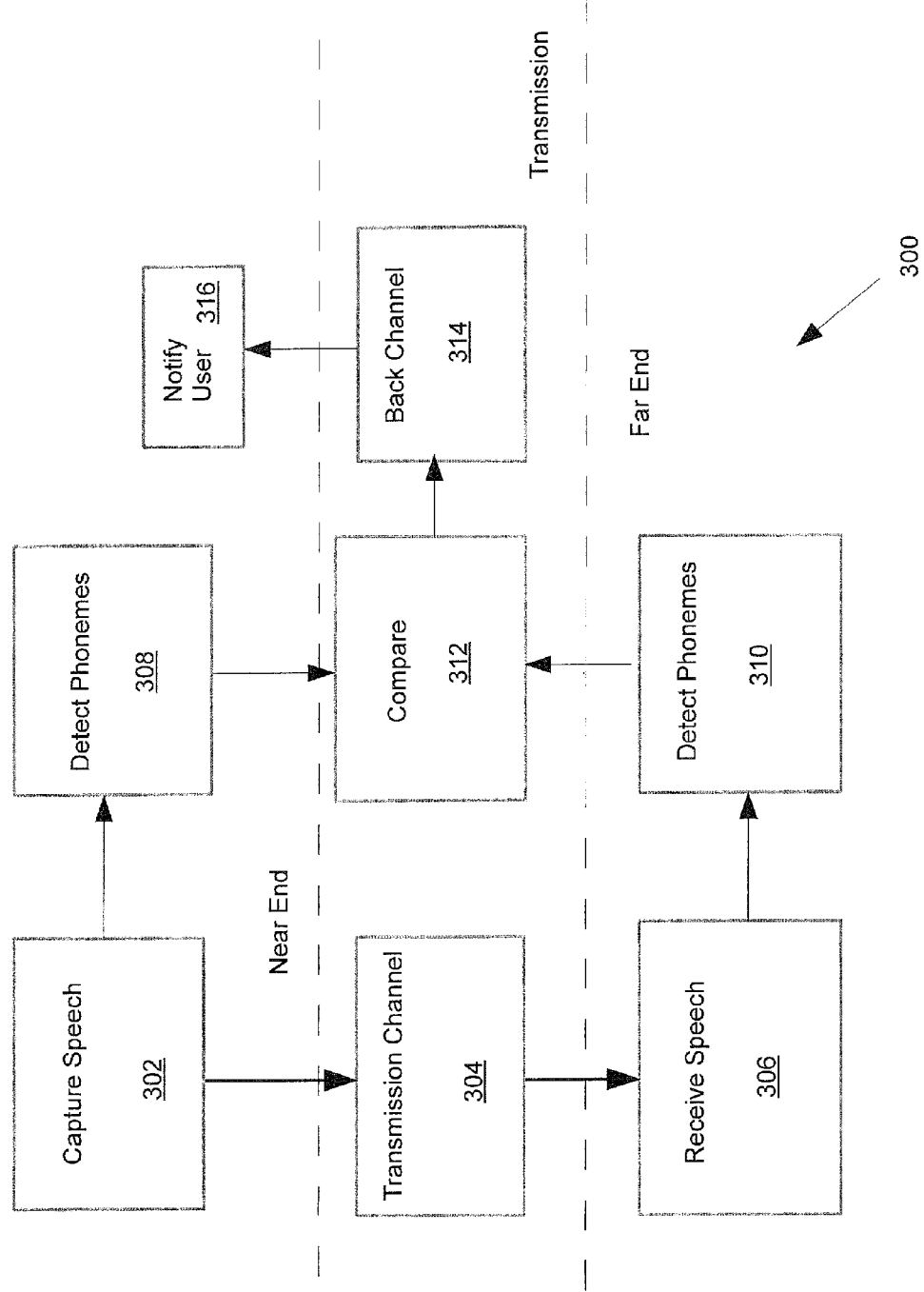

Three alternative schemes for determination of the phonemes, communication of this determination, comparison, and notification, are shown in FIGS. 2A-2C. In each of these drawings there is an indication of the near end (which is defined as the end at which the current speaker is located and so varies over the course of a call), the far end (which is defined as the end at which the current recipient(s) are located and so varies over the course of a call), and the transmission media between the two ends. FIG. 2A illustrates the case of system 100, where speech is captured 102 at the near end and is transmitted via channel 104 to the far end where it is received 106. Phonemes are detected at the near end 108 and at the far end 110. The results of the far end detection are sent over back channel 112 to near end comparison 114. If the predetermined quality metrics are not met, the user (speaker) is notified 116. The result of the comparison can also be communicated to the far end over back channel 112, and the far end user can be notified of an error 118. Alternatively, the comparison can be made at both ends, with errors reported locally at both ends. Notification of either the speaker or of all the parties on the call applies to each example described herein.

FIG. 2B illustrates the case of system 200, where speech is captured 202 at the near end and is transmitted via channel 204 to the far end where it is received 206. Phonemes are detected at the near end 208 and at the far end 210. The results of the near end detection are sent over back channel 212 to far end comparison 214. The comparison results are sent back to the near end over back channel 212. If the predetermined quality metrics are not met, the user (speaker) is notified 216.

FIG. 2C illustrates the case of system 300, where speech is captured 302 at the near end and is transmitted via channel 304 to the far end where it is received 306. Phonemes are detected at the near end 308 and at the far end 310. The results of the both the near end and the far end detection are sent to comparison 312 that is located other than at the near or far end. The comparison results are sent back to the near end over back channel 314. If the predetermined quality metrics are not met, the user (speaker) is notified 316.

The comparison of the determined speech characteristics and any resultant notification to the user will normally take place continuously, as the conversation proceeds. Since an overall aim is to notify the speaker when the speech has been corrupted by the transmission channel, the result of the comparison needs to either reside in or be transmitted to the near-end telepresence network appliance 10 where the person speaking is located. The notification to the speaker if the comparison does not meet a pre-determined quality metric can take various forms. The notification is typically one or both of a video signal and an audio signal. In cases in which the video display at the near end displays an image of the speaker, the notification can comprise a video notification on this portion of the display. In one non-limiting example, the portion of the display can be turned a distinctive color such as red, which can remain solid or flash so as to capture the speaker's attention. Other colors could be displayed and other means of notification via the display could be accomplished. Another way to notify the participants of an error would be to perform speech recognition at the near and far ends and highlight the words that did not get detected at the far end. This would allow the speaker to know the specific words that were not properly received and make appropriate corrections, such as repeating the words. An audio error notification could be a distinctive tone, for example, played over loudspeaker 20.

One non-limiting manner by which the phoneme measurement and comparison could be accomplished is as follows. The speech is captured and run through the phoneme detection algorithm. Each phoneme is given an identifier and timestamp. The phoneme list is sent over the back channel. As the far end system plays the decoded audio, it also runs its microphone input through an identical phoneme detection algorithm. Alternatively, phoneme detection could be accomplished on the audio signals that are applied to the loudspeakers at the far end, or the digitized speech anywhere in the signal chain from the point where it is received at the far end and rendered by the loudspeakers at the far end. The timestamps from the audio and the phoneme list are aligned. The measured phoneme list is compared with the received list. Errors are recorded when phonemes and/or timestamps do not match sufficiently. When the number of errors detected in a period of time exceeds a threshold, both the near and far end are notified. Any errors that do not cause a notification will expire after a period of time.

Far-end audio intelligibility can also be compromised by far-end noise and acoustic environmental issues such as HVAC sounds. The impact of such far-end noise can be accounted for by using far-end speaker 40 to play the speech received from the near end, and then using microphone 38 to capture sound, which will include the reproduced voice as well as any noise present in the far-end environment. By conducting a symbolic analysis of a type described above on the output of microphone 38, and then a comparison to the same analysis conducted on the speech captured at the near-end, intelligibility due to the far end environment can be measured and the person speaking (and/or the recipient) can be notified in a manner as described above.

The devices, systems and methods described above can be applied to audio communications using different hardware and/or using different transmission media. For example, a cell phone to cell phone or cell phone to landline call will be carried at least in part over a wireless network, and potentially over a variable-path network other than the public switched telephone network, such as the internet. Such calls are thus also subject to audio fidelity issues due to the transmission medium or media. In any such case, a processor that is part of the hardware that is used to accomplish the audio communication, or an additional processor added to the hardware, can be used to determine the speech characteristics, transmit them, and then make the comparisons, as described above.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMs, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method for evaluation of the quality of a bi-directional transmission channel while the bi-directional transmission channel is being used to transmit an electronic speech signal that is derived from speech that was spoken by a human speaker and captured at a near end of the bi-directional transmission channel, where the speech signal is transmitted over the bi-directional transmission channel and used to reproduce the speech at a far end of the bi-directional transmission channel, the method comprising:
   determining near-end characteristics of the speech at the near end of the bi-directional transmission channel;
   determining, at the far end of the bi-directional transmission channel and from the transmitted speech signal, far-end characteristics of the speech;
   comparing the near end and far end speech characteristics and developing comparison results; and
   causing notification of the speaker if the comparison results do not meet a predetermined quality metric:
   wherein at least one of the far end speech characteristics and the comparison results are transmitted over the bi-directional transmission channel to the near end of the bi-directional transmission channel.

2. The method of claim 1 wherein the characteristics of the speech comprise speech phonemes.

3. The method of claim 2 wherein the predetermined quality metric comprises a threshold number of errors in a comparison of the speech phonemes.

4. The method of claim 1 wherein the comparison is made at a location selected from the group of locations consisting of the near end of the bi-directional transmission channel, the far end of the bi-directional transmission channel, both the near end and far end of the bi-directional transmission channel, and another location that is accessible to both the near end and the far end of the bi-directional transmission channel.

5. The method of claim 1 wherein there is a telepresence network appliance at each of the near end of the bi-directional transmission channel and the far end of the bi-directional transmission channel, each such network appliance comprising a video display and an audio output device, each such network appliance configured to send and receive voice and video over the bi-directional transmission channel, and wherein the notification of the speaker comprises at least one of a video notification and an audio notification conveyed via the near end network appliance.

6. The method of claim 5 wherein the notification comprises a warning message superimposed on the video display of the near end network appliance.

7. The method of claim 1 further comprising causing notification of the recipient at the far end if the comparison does not meet a predetermined quality metric.

8. The method of claim 1 further comprising performing speech recognition of the speech at both the near end of the bi-directional transmission channel and the far end of the bi-directional transmission channel and displaying the recognized speech, and wherein the notification comprises highlighting displayed words that were not received properly at the far end of the bi-directional transmission channel.

9. A device configured for evaluation of the quality of a bi-directional transmission channel while the bi-directional transmission channel is being used to transmit an electronic speech signal that is derived from speech that was spoken by a human speaker and captured at a near end of the bi-directional transmission channel, where the speech signal is transmitted over the bi-directional transmission channel and used to reproduce the speech at a far end of the bi-directional transmission channel, the device comprising:
 a processor at one end of the bi-directional transmission channel and configured to:
  determine one or more near-end characteristics of the speech at the near end of the bi-directional transmission channel;
  receive over a backchannel of the bi-directional transmission channel far-end characteristics of the same speech that have been determined at the far end of the bi-directional transmission channel;
  compare the near end and far end speech characteristics and develop comparison results; and
  notify the speaker if the comparison results do not meet a predetermined quality metric.

10. The device of claim 9 wherein the characteristics of the speech comprise speech phonemes.

11. The device of claim 10 wherein the predetermined quality metric comprises a threshold number of errors in a comparison of the speech phonemes.

12. The device of claim 9 wherein there is a telepresence network appliance at each of the near end of the bi-directional transmission channel and the far end of the bi-directional transmission channel, each such network appliance comprising a processor, a video display and an audio output device, each such network appliance being configured to send and receive voice and video over the bi-directional transmission channel, and wherein the notification of the speaker comprises at least one of a video notification and an audio notification conveyed via the near end network appliance.

13. The device of claim 12 wherein the notification comprises a warning message superimposed on the video display of the near end network appliance.

14. A system for the real-time evaluation of the quality of a bi-directional transmission channel, wherein the bi-directional transmission channel is used to transmit an electronic speech signal that is derived from speech that is spoken by a human speaker and captured at a near end of the bi-directional transmission channel, where the speech signal is transmitted over the bi-directional transmission channel and used to reproduce the speech at a far end of the bi-directional transmission channel, the system comprising:
 a first processor configured to determine one or more near-end characteristics of the speech at the near end of the bi-directional transmission channel;
 a second processor configured to determine far-end characteristics of the same speech after it has been received at the far end of the bi-directional transmission channel;
 wherein at least one of the first and second processors are further configured to cause communication of determined characteristics between the near end of the bi-directional transmission channel and the far end of the bi-directional transmission channel;
 wherein at least one of the first and second processors are still further configured to compare the near-end and far-end speech characteristics; and
 wherein at least one of the first and second processors are still further configured to cause notification to the speaker if the comparison does not meet a predetermined quality metric:
 wherein at least one of the far end speech characteristics and the comparison results are transmitted over the bi-directional transmission channel to the near end of the bi-directional transmission channel.

15. The system of claim 14 wherein the characteristics of the speech comprise speech phonemes.

16. The system of claim 15 wherein the predetermined quality metric comprises a threshold number of errors in a comparison of the speech phonemes.

17. The system of claim 14 wherein the second processor is configured to cause transmission of the phonemes it has determined to the near end of the bi-directional transmission channel.

18. The system of claim 14 further comprising a telepresence network appliance at each of the near end of the bi-directional transmission channel and the far end of the bi-directional transmission channel, each such network appliance comprising a processor, a video display, and an audio output device, and being configured to send and receive voice and video over the bi-directional transmission channel, and wherein the notification to the speaker comprises at least one of a video notification and an audio notification conveyed via the near-end network appliance.

19. The system of claim 18 wherein the notification comprises a warning message superimposed on the video display of the near-end network appliance.

20. The system of claim 18 wherein the second processor is further configured to determine the same characteristics of the same speech after the speech has been received at the far end of the bi-directional transmission channel and then reproduced at the far end of the bi-directional transmission channel by a loudspeaker.

* * * * *